June 11, 1957  H. BOHLI ET AL  2,795,740
PERMANENT MAGNET CHUCKS
Filed March 24, 1953.
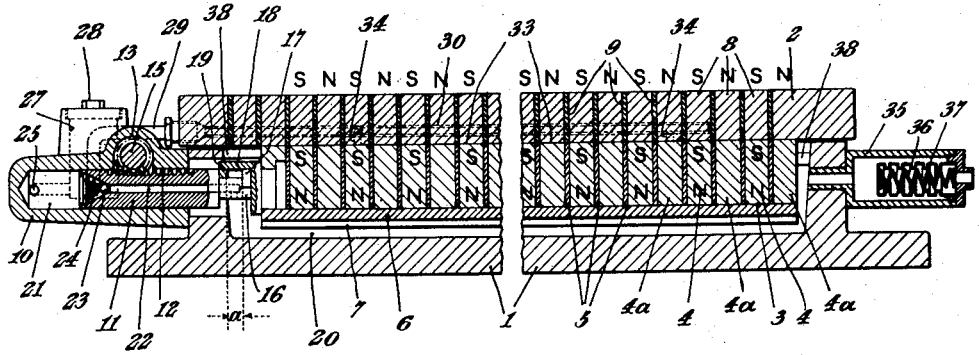
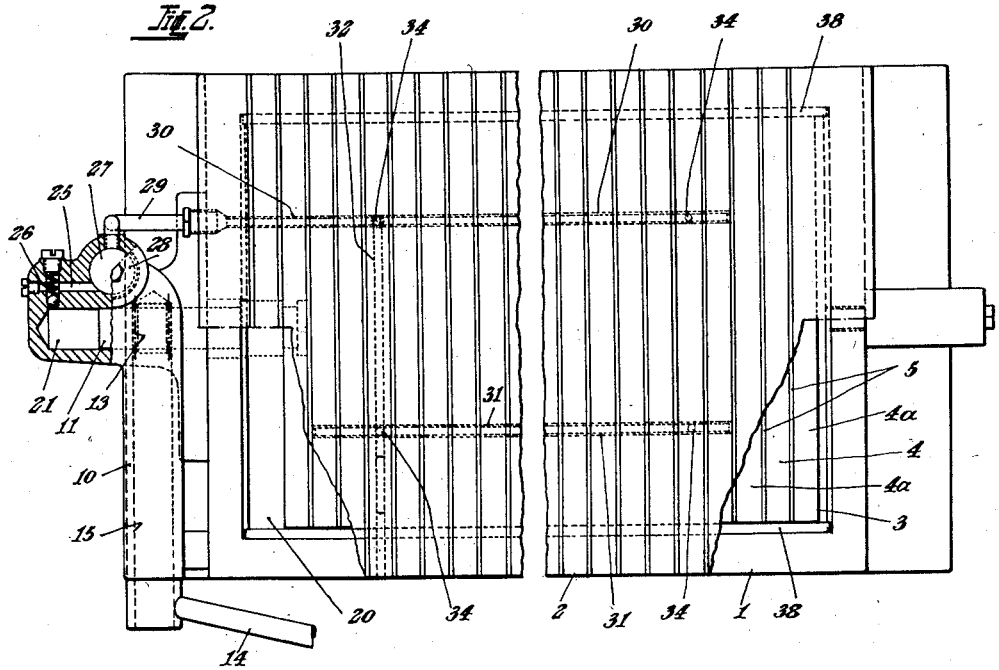
HANS BOHLI
JAKOB BOHLI
INVENTORS

United States Patent Office 2,795,740
Patented June 11, 1957

2,795,740

PERMANENT MAGNET CHUCKS

Hans Bohli and Jakob Bohli, Solothurn, Switzerland

Application March 24, 1953, Serial No. 344,406

7 Claims. (Cl. 317—159)

This invention relates to a controllable permanent magnet chuck comprising a pole plate unit and a magnet unit arranged for relative sliding movement, in which means are provided for supplying lubricant, under pressure, through distributing means in order to provide a film of lubricant between the mutually engaging sliding surfaces of the permanent magnet unit and the pole plate unit.

The possibility of temporarily providing a film of lubricant to reduce sliding friction between the magnet and the pole plate, which are displaced or turned in relation to one another for the purpose of controlling the magnetic action of the chuck, affords the advantages that due to the previous provision of a film of lubricant the friction to be overcome on the initiation and elimination of the said action is reduced to a small fraction, for example one-tenth, of the dry friction, and accordingly, the surfaces of the magnet and of the pole plate which form the sliding surface and which are exposed to a high surface pressure do not tend to bind. Very narrow limits are placed on the dimensioning of conventional chucks due to the force necessary for the initiation and cutting off of the action and the danger of binding as a result of the surface pressure, while on the other hand the present invention provides a means of very considerably widening these limits.

An embodiment of the subject of the invention is illustrated by way of example in the accompanying drawings, in which:

Figure 1 shows a fragmentary vertical longitudinal section through a permanent magnet chuck comprising a pole plate and a magnet plate longitudinally displaceable in relation thereto, and Figure 2 is a plan view corresponding to Figure 1 showing parts partially broken away.

In the illustrated chuck, 1 is the casing, 2 the pole plate and 3 the magnet plate, which bears against the lower side of the pole plate 2 owing to its magnetic attractive force. The magnet plate 3 is composed of juxtaposed permanent magnet bars 4 and iron bars 4a comprising a north pole and a south pole facing the pole plate 2 in alternating sequence and between the said magnet bars 4 and iron bars 4a anti-magnetic distance bars 5, the whole assembly of bars being held together by screw bolts (not shown), while a plate 6 serves to hold the magnetic bars 4 and iron bars 4a together and to connect them magnetically, the said plate 6 being screwed fast to the lower side of the latter. The magnet plate 3 may consist of one or more such assemblies of magnet bars 4, iron bars 4a, distance bars 5 and plate 6. Where a number of assemblies are provided in the case of chucks of large dimensions, such assemblies are connected together by bands 7, firmly screwed to the plates 6. The pole plate 2 is composed of juxtaposed iron bars 8 and anti-magnetic distance bars situated therebetween, the whole being held together by screw bolts not shown, and the said pole plate extending to the longitudinal edge of the chuck, so that the entire width of the latter can be magnetically utilised.

Secured to one end face of the casing 1 by means of screws not shown is a pump casing 10 with a plunger 11, which comprises axial rack teeth 12 and is displaceable by means of an operating lever 14 through a pinion 13 engaging with the said rack teeth and mounted on the pin 15 of the said operating lever. The plunger 11 has extending towards the magnet plate 3 a neck 16 of smaller diameter than the plunger and on the free end thereof a collar 17 extending over half the circumference of the neck. A half-cylinder 18 secured to the magnet plate 3 surrounds the collar 17 and comprises an inwardly projecting collar 19 bearing against half the circumference of the neck, with which collar the plunger 11 engages by the free end of its neck when the plunger is moved to the right, in Figure 1, while when the plunger is moved to the left, through the distance $a$ the collar 17 thereof engages with the said collar 19 and then carries along the magnet plate 3. The plunger 11 has a bore 22 leading from the hollow interior 20 of the casing filled with a lubricant, for example lubricating oil, through the plunger neck 16 and into the pump chamber 21 also filled with lubricating oil, against the mouth of which bore a valve ball 23 is pressed by a closing spring 24 bearing against the plunger 11.

A passage 25 leads from the pump chamber 21 through a non-return ball valve 26 into a pressure-accumulating chamber 27, the said accumulating chamber being for this purpose filled with air in its upper part above the level of the lubricating oil and closed off in fluid-tight fashion from the atmosphere by a screw cover 28. A pipe 29 extends from the pressure accumulating chamber 27, the said pipe being connected at the forward end of the pole plate 2 to the main duct of a system of ducts consisting of the said main duct and branch ducts and provided in the pole plate 2. The main duct and a branch duct parallel thereto extend transversely through some of the iron bars 8 and distance bars 9 of the pole plate 2 and each consists of a tube 30, 31 fitted in a corresponding bore. A branch duct 32 connecting the tubes 30 and 31, and branch ducts 34 leading from the tubes 30 and 31 down to the sliding surface 33 bearing against the magnet plate 3 are provided in the iron bars 8, the branch ducts 34 being provided at approximately equal distances apart.

To that end of the casing 1 which is further from the pump casing 10 is connected an equalising container 35 communicating with the hollow interior 20 of the casing, the said equalising container being closed off in fluid-tight fashion from the atmosphere by elastic bellows 37 loaded by a coil spring 36.

When the pump plunger moves from left to right in Figure 1 through the distance $a$, a quantity of lubricating oil flows from the interior 20 of the casing into the pump chamber 21, and when the plunger returns, this quantity of lubricating oil passes into the accumulating chamber 27, in which the volume of air is compressed under increased pressure which is propagated through the pipe 29 and the duct system 30, 31, 32 to the sliding surface 33. After a number of plunger movements, the pressure reaches a sufficient value, for example 20 atmospheres, for a film of lubricating oil to form on the sliding surface 33 between the pole plate 2 and the magnet plate 3, the said film of lubricating oil forcing the magnet plate 3 away from the pole plate to a distance of, for example $\frac{4}{100}$ mm. against the magnetic attraction. The movement of the plunger can then be readily continued for the purpose of shifting the magnet plate 3 from the operative position shown in the drawing from left to right beyond the path $a$ of the plunger by means of the operating lever 14, into the inoperative position, in which the distance bars 5 lie below the centre of the iron bars 8 of the pole plate 2. The operative and inoperative positions of the magnet plate can each be determined by a separate stop not shown. Under the action of the magnetic attractive force of the magnet plate on the pole plate, the film of lubricating oil is gradually nullified when the pump is not in action, the lubricating oil flowing into the interior 20 of the casing. The bellows 37 of the equalising container 35 will extend more or less deeply into the container 35 under the pressure of the spring 36 in accordance with the quantity of lubricating oil extracted from the interior of the casing by the pump or fed into the said casing as the film of lubricating oil forms or disappears. The operating displacement of the magnet plate is prepared for and effected similarly to the disengaging displacement described.

According to the width of the plates 2 and 3, more than one branch duct 31 parallel to the main duct 30 may be provided. Similarly, the number of outlet ducts 34 and the cross-section thereof may be adapted to the dimensions of the plate in order that an even, unbroken film of lubricating oil may form. The magnet plate or plates are guided in the direction of displacement on lateral ribs 38 on the casing.

Instead of being manually effected, the displacement of the plate could also take place under hydraulic pressure, for example oil pressure, for which purpose a two-way ram and a changeover valve may be provided in a manner known per se. An oil pump could then be employed, for example, for the generation and for the formation of the film of lubricating oil and for the operation of the two-way ram.

In principle, the described means employed for the generation of a film of lubricant and if desired also for a relative movement of the magnetic and pole plates could be suitably constructed for use in permanently magnetic chucks adapted to be engaged and disengaged by a rotational movement.

What I claim is:

1. In a controllable permanent magnet chuck for releasably holding a magnetizable workpiece, in combination with a permanent magnet unit comprising at least one permanent magnet having two pole faces and non-magnetic material disposed adjacent to said pole faces, said pole faces and said non-magnetic material being shaped to define a first surface adapted for sliding engagement with a pole piece unit, and a pole piece unit comprising a plurality of pole members formed of magnetizable material, each having a first portion thereof adapted for engagement with one of said pole faces and a second portion adapted for engagement with said workpiece, and further non-magnetic material disposed adjacent to said pole members, said further non-magnetic material together with said first portions of said pole members being shaped to define a second surface slidingly engaging said first surface and said further non-magnetic material together with said second portions of said pole members being shaped to define a third surface adapted for engagement with said workpiece, relative movement of said first and second surfaces between an operative position and an inoperative position controlling the magnetization of said pole members at said third surface and the holding of said workpiece by said chuck, the provision of: a controllable source of fluid lubricant under pressure, and distributing means communicating with said source and defining a passage communicating with said first and second surfaces for introducing said lubricant between said first and second surfaces whereby the frictional force which would otherwise oppose said relative movement is reduced and the control of said chuck is facilitated.

2. The combination according to claim 1, in which said source of fluid under pressure includes a pump.

3. The combination according to claim 2, in which said pump comprises a reciprocable plunger for producing said pressure, said combination further comprising connecting means permitting limited free movement of said plunger and connecting said plunger, upon movement beyond said limited range of free movement, to one of said units for causing said relative displacement between said first and second surfaces.

4. The combination according to claim 3, further comprising a manually operable member coupled to said plunger for causing both said reciprocatory movement and said relative displacement.

5. The combination according to claim 1, further comprising a hollow fluid-tight casing enclosing said magnet unit and at least a portion of said pole piece unit, said third surface being exposed for engagement with said workpiece, and the interior of said casing being substantially filled with said fluid lubricant.

6. The combination according to claim 5, further comprising constant pressure means communicating with the interior of said casing, said constant pressure means acting on the fluid lubricant in said casing to maintain said lubricant under substantially constant pressure.

7. The combination according to claim 1, further comprising a two-way hydraulic ram operated by said source of lubricant and connected to one of said units for causing said relative movement between said operative and inoperative positions.

References Cited in the file of this patent
UNITED STATES PATENTS
2,464,317    Karasick _____ Mar. 15, 1949